(12) United States Patent
Gade et al.

(10) Patent No.: US 8,244,750 B2
(45) Date of Patent: Aug. 14, 2012

(54) RELATED SEARCH QUERIES FOR A WEBPAGE AND THEIR APPLICATIONS

(75) Inventors: Krishna Chaitanya Gade, Redmond, WA (US); Srinath Reddy Aaleti, Redmond, WA (US); Nicholas Eric Craswell, Cambridge (GB); Amit Prakash, Bellevue, WA (US); Hugh Evan Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 11/690,585

(22) Filed: Mar. 23, 2007

(65) Prior Publication Data

US 2008/0235187 A1    Sep. 25, 2008

(51) Int. Cl.
*G06F 17/30* (2006.01)
(52) U.S. Cl. ........ 707/767; 707/768; 707/722; 707/736; 707/706
(58) Field of Classification Search .................. 707/2, 3, 707/4, 767, 768, 722, 736, 706, 999.005
See application file for complete search history.

(56) References Cited

U.S. PATENT DOCUMENTS

| | | | |
|---|---|---|---|
| 6,311,194 B1 | 10/2001 | Sheth et al. | |
| 6,321,228 B1 * | 11/2001 | Crandall et al. | 1/1 |
| 6,513,031 B1 * | 1/2003 | Fries et al. | 1/1 |
| 6,732,088 B1 * | 5/2004 | Glance | 1/1 |
| 6,772,150 B1 * | 8/2004 | Whitman et al. | 707/721 |
| 6,990,494 B2 | 1/2006 | Bates | |
| 7,124,125 B2 | 10/2006 | Cook | |
| 2002/0103786 A1 * | 8/2002 | Goel | 707/3 |
| 2002/0103788 A1 * | 8/2002 | Donaldson et al. | 707/3 |
| 2002/0147880 A1 * | 10/2002 | Wang Baldonado | 711/1 |
| 2002/0156917 A1 * | 10/2002 | Nye | 709/238 |
| 2003/0070039 A1 * | 4/2003 | Gillingham | 711/108 |
| 2005/0004889 A1 * | 1/2005 | Bailey et al. | 707/1 |
| 2005/0060311 A1 * | 3/2005 | Tong et al. | 707/7 |
| 2005/0080775 A1 | 4/2005 | Colledge | |
| 2005/0131866 A1 * | 6/2005 | Badros et al. | 707/3 |
| 2005/0144086 A1 * | 6/2005 | Speiser et al. | 705/26 |

(Continued)

FOREIGN PATENT DOCUMENTS

EP    1320042 A2    6/2003

(Continued)

OTHER PUBLICATIONS

Finding Advertising Keywords on Web Pages, http://delivery.acm.org/10.1145/1140000/1135813/p213-yih.pdf?key1=1135813&key2=1355309611&coll=GUIDE&dl=GUIDE&CFID=11675315&CFTOKEN=19914551, p. 222.

(Continued)

*Primary Examiner* — Dennis Truong
(74) *Attorney, Agent, or Firm* — Shook Hardy & Bacon, LLP (57) ABSTRACT

An inversion of the basic format of searching is provided herein. Instead of receiving a search query and providing web page results, a search engine receives a web page identifier as search input from an end user, determines related search queries for the associated web page, and provides the related search queries to the end user issuing the search. Related search queries for web pages may also be used to refine search engines performing the basic form of searching by facilitating the determination of web pages to index and the ranking of web pages as search results to user queries. Additionally, related search queries may be used in advertising revenue generation and sharing.

7 Claims, 10 Drawing Sheets

U.S. PATENT DOCUMENTS

| | | | |
|---|---|---|---|
| 2005/0144162 A1* | 6/2005 | Liang | 707/3 |
| 2005/0149395 A1 | 7/2005 | Henkin | |
| 2005/0209874 A1 | 9/2005 | Rossini | |
| 2005/0216454 A1* | 9/2005 | Diab et al. | 707/3 |
| 2005/0216533 A1* | 9/2005 | Berkhin | 707/204 |
| 2005/0262428 A1 | 11/2005 | Little | |
| 2006/0026071 A1 | 2/2006 | Radwin | |
| 2006/0161520 A1* | 7/2006 | Brewer et al. | 707/3 |
| 2006/0212350 A1 | 9/2006 | Ellis | |
| 2006/0218115 A1 | 9/2006 | Goodman | |
| 2006/0229942 A1 | 10/2006 | Miller | |
| 2006/0242135 A1* | 10/2006 | Weare | 707/4 |
| 2006/0248068 A1* | 11/2006 | Chien et al. | 707/4 |
| 2006/0253421 A1* | 11/2006 | Chen et al. | 707/2 |
| 2006/0259473 A1 | 11/2006 | Li | |
| 2007/0050339 A1* | 3/2007 | Kasperski et al. | 707/3 |
| 2007/0061298 A1* | 3/2007 | Wilson et al. | 707/3 |
| 2007/0074125 A1* | 3/2007 | Platt et al. | 715/760 |
| 2007/0174255 A1* | 7/2007 | Sravanapudi et al. | 707/3 |
| 2007/0271255 A1* | 11/2007 | Pappo | 707/5 |
| 2007/0288454 A1 | 12/2007 | Bolivar et al. | |
| 2008/0016019 A1* | 1/2008 | Loftus et al. | 706/47 |
| 2008/0071542 A1* | 3/2008 | Yu | 704/270 |
| 2009/0024718 A1 | 1/2009 | Anagnostopoulos et al. | |
| 2009/0089830 A1 | 4/2009 | Chandratillake et al. | |
| 2009/0164949 A1 | 6/2009 | Henkin et al. | |
| 2009/0228802 A1 | 9/2009 | Shan et al. | |

FOREIGN PATENT DOCUMENTS

| | | |
|---|---|---|
| KR | 1020040072983 A | 8/2004 |
| KR | 1020060108248 A | 10/2006 |

OTHER PUBLICATIONS

Impedance Coupling in Content Targeted Advertising, http://homepages.dcc.ufmg.br/~berthier/conference_papers/sigir_2005a.pdf, p. 8.

A Model to Support Targeted Advertising with Term Vectors and sentiment Distinction, http://wwwhome.cs.utwente.nl/~referaat/documents/2005_03_C-INTELLIGENT_INTERACTION/2005_03_C_Baal,C.S.M.van-A_model_to_support_targeted_advertising_with_term_vectors_and_sentiment_distinction.pdf, p. 1.

Eibe Frank, et al., Domain-Specific Keyphrase Extraction, Department of Computer Science University of Waikato, Hamilton, New Zealand, Machine Learning, pp. 668-671.

Anette Hulth, Improved Automatic Keyword Extraction Given More Linguistic Knowledge, Department of Computer and Systems Sciences, Stockholm University, Sweden.

Daniel Kelleher, et al., Automatic Hypertext Keyphrase Detection, University of Dublin, Trinity College Department of Computer Science, O'Reilly Institute, Dublin, Ireland.

Hai Leong Chieu, A Maximum Entropy Approach to Information Extraction from Semi-Structured and Free Text, American Association for Artificial Intelligence.

PCT International Search Report and Written Opinion, Jul. 25, 2008.

Broder, Andrei, et al., A Semantic Approach to Contextual Advertising—Published Date: Jul. 2007 http://delivery.acm.org/10.1145/1280000/1277837/p559-broder.pdf?key1=1277837&key2=9009330621&coll=GUIDE&dl=GUIDE&CFID=67448936&CFTOKEN=10359009.

LucidMedia—Retrieved Date: Dec. 2009 http://www.lucidmedia.com/about_our_technology_2/.

Merle, Contextual Advertising—Retrieved Date: Dec. 2009 http://www.streetdirectory.com/travel_guide/10984/adsense_tips/contextual_advertising_is_it_right_for_you.html.

AdSense—Retrieved Date: Dec. 2009 http://en.wikipedia.org/wiki/AdSense.

Extended European Search Report of EP 08 72 9250, mailed Mar. 2, 2011.

* cited by examiner

RELATED SEARCH QUERIES FOR A WEBPAGE AND THEIR APPLICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The amount of information and content available on the Internet continues to grow exponentially. Given the vast amount of information, search engines have been developed to facilitate web searching. In particular, users may search for information and documents by entering search queries comprising one or more terms that may be of interest to the user. After receiving a search query from a user, a search engine identifies documents and/or web pages that are relevant based on the terms. Because of its utility, web searching, that is, the process of finding relevant web pages and documents for user issued search queries has arguably become the most popular service on the Internet today. However, this basic format in which web searches have been conducted, namely, providing web page and document results for user issued queries, has remained the same since the origin of web search.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to an inversion of the basic format of searching. Instead of receiving a search query and providing web page results, a search engine receives a web page identifier as search input from an end user and determines related search queries for the associated web page. Related search queries for a particular web page may be determined in a variety of different manners in accordance with various embodiments. The related search queries may be provided to the end user issuing the search.

In further embodiments, the inversion format of searching may be used to refine and improve the core relevance for a search engine providing the basic form of searching. In one aspect, related search queries for web pages may be used to determine which web pages to index for a search engine. In another aspect, related search queries may be used in ranking web pages as search results for queries, thereby improving the relevance of searches.

In still further embodiments, related search queries for a web page may be extended to particular business applications. For instance, related search queries for a web page may be placed on the web page. When users select related search queries from the web page, search results for the selected related search queries are presented with advertisements. In some embodiments, any advertising revenue generated by such advertisements may be shared by the search engine with the web page owner.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated previously, the basic format in which searching for web pages is performed has remained essentially the same since its origin. In particular, a search engine receives as search input from a user a search query including one or more search terms and provides search results indicating a number of web pages relevant to the search query. Embodiments of the present invention provide an inversion to this basic format of searching, and, as such, is referred to herein as "inversion searching." Instead of receiving a search query and providing web page results, a search engine receives an identifier of a web page (e.g., a URL) as search input from a user and provides related search queries for the web page. Although not required, the related search queries theoretically would indicate the web page as a search result if searches were performed using the related search queries (assuming, for instance, that the web page is indexed by the search engine).

In further embodiments of the present invention, the inversion format of searching may be used to refine and improve the core relevance for a search engine providing the basic form of searching. In one embodiment, related search queries for web pages may be used to determine which web pages to index for a search engine. In another embodiment, related search queries may be used in ranking web pages as search results for queries, thereby improving the relevance of searches.

In still further embodiments of the present invention, related search queries for a web page may be extended to particular business applications. For instance, related search queries for a web page may be placed on the web page. When users select related search queries from the web page, search results for the selected related search queries are presented with advertisements. In some embodiments, any advertising revenue generated by such advertisements may be shared by the search engine with the web page owner. This approach not only increases the search engine's traffic but also helps the web page owner provide a rich experience to visitors and generates revenue for both the search engine and the web page owner.

Accordingly, in one aspect, an embodiment of the present invention is directed to a computer-implemented method for providing one or more related search queries for a web page. The method includes receiving a web page identifier as search input from an end user via an input box configured to receive input for a search engine. The method also includes determining one or more related search queries for the web page. The method further includes communicating at least a portion of related search queries for presentation to the end user.

In another embodiment, an aspect of the invention is directed to a computer-implemented method for determining whether to index a web page in a search engine index. The method includes identifying one or more related search queries for the web page. The method also includes determining whether to index the web page in the search engine index based on the related search queries. The method further includes indexing the web page in the search engine index if it is determined that the web page should be indexed.

A further embodiment of the present invention is directed to a computer-implemented method for ranking a number of web pages as search results for a search query. The method includes determining one or more related search queries for at least a portion of the web pages. The method also includes ranking the web pages based at least in part on the related search queries.

Figure 1:
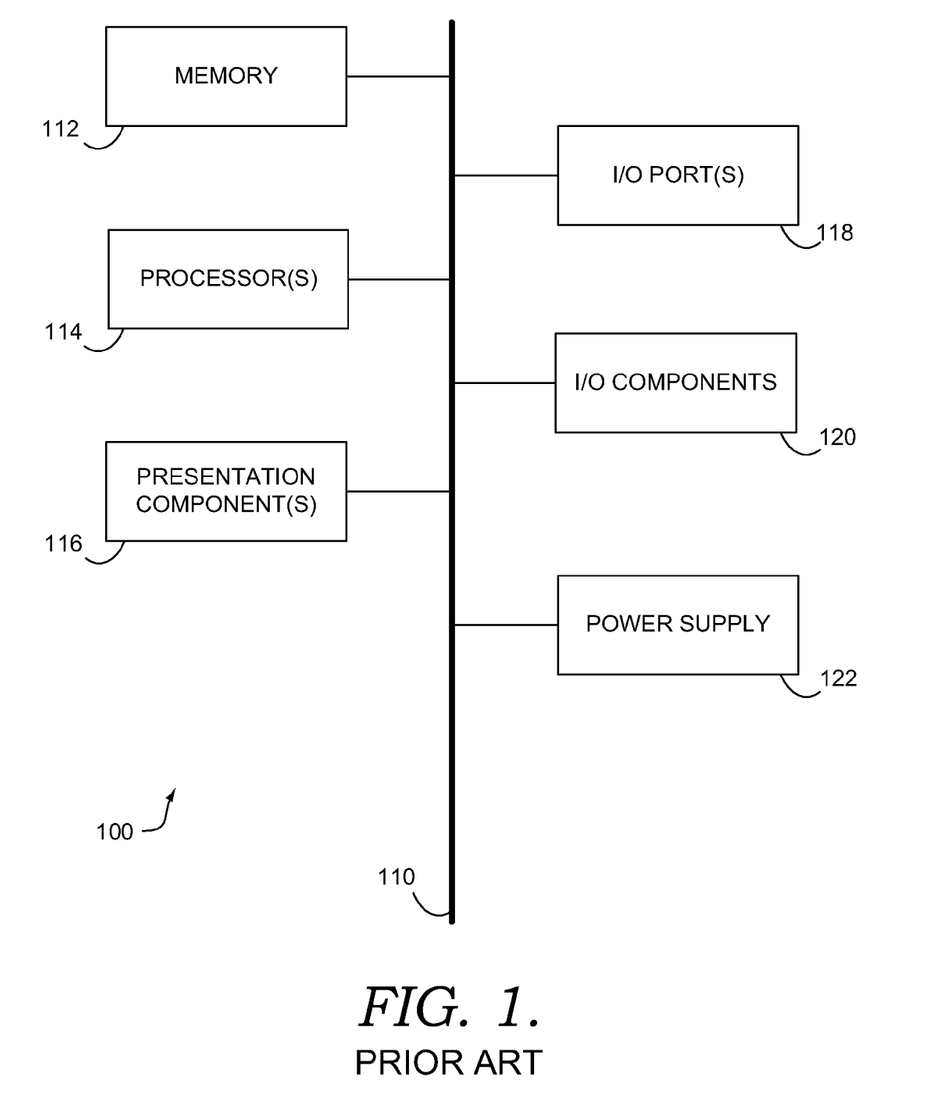
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
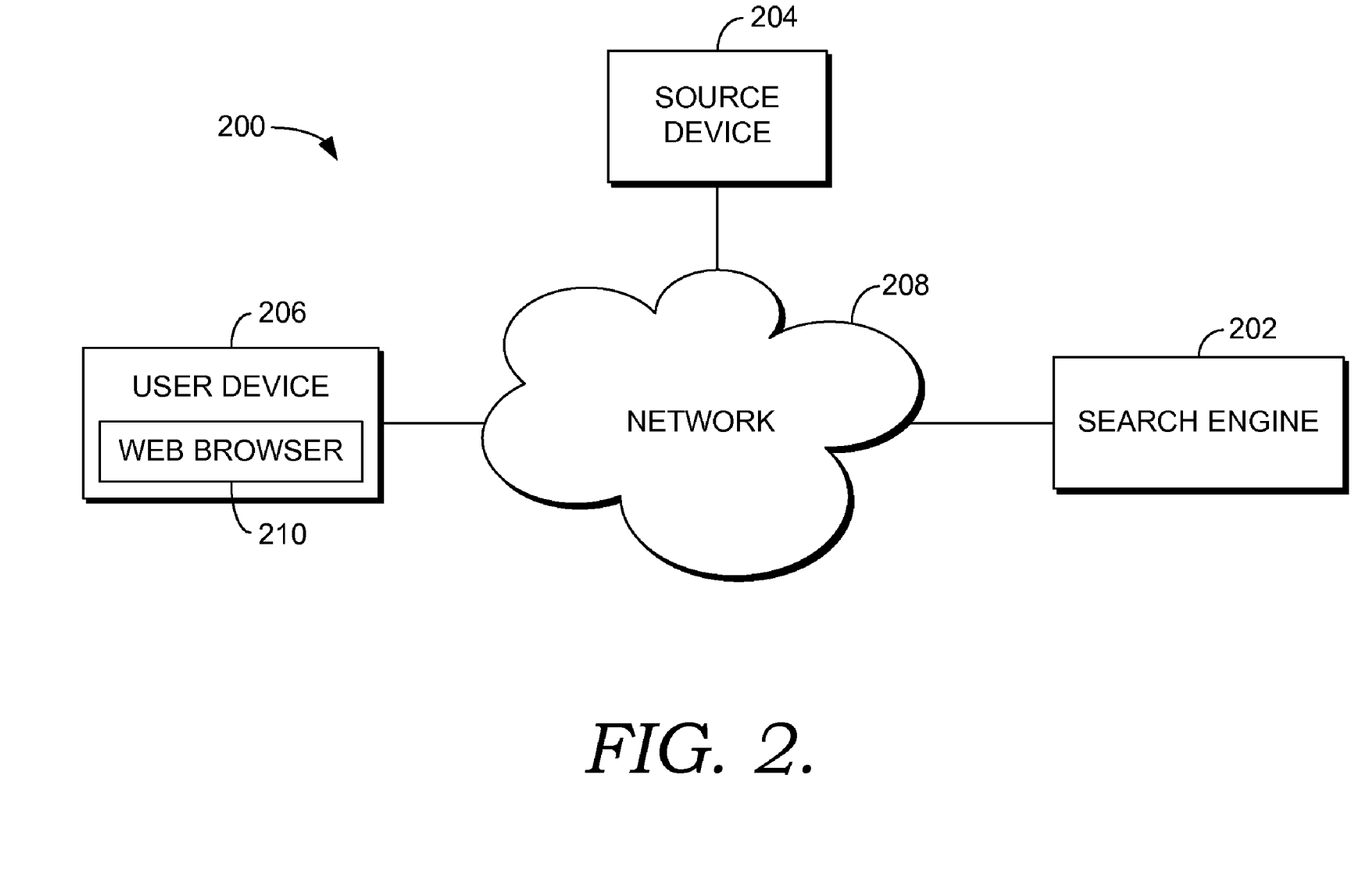
FIG. 2 is a block diagram of an exemplary system in which embodiments of the present invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a search engine 202, a source device 204, and a user device 206. Each of the search engine 202, source device 204, and user device 206 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of content sharing servers, advertising servers, user devices, and networks may be employed within the system 200 within the scope of the present invention. Additionally, other components not shown may also be included within the system 200.

Source devices, such as the source device 204, may maintain a variety of web pages. For example, the source device 204 may be a web server that maintains multiple web pages. The search engine 202 may access web page information by communicating with these source devices. For example, the search engine 202 may periodically crawl the source device 204 to access web page information and/or index the information.

By accessing and/or indexing web page information from various source devices, the search engine 202 may provide search capabilities to user devices, such as the user device 206. In particular, a user may employ a web browser 210 or other mechanism on the user device 206 to communicate with the search engine 202. For instance, a user may issue a search query to the search engine 202 and receive search results. As indicated previously, in the traditional form of searching, the search query may comprise one or more search terms, and the search engine 202 attempts to provide web page search results that are relevant to those search terms. In embodiments of the present invention, the search engine 202 is configured to provide inversion searching capabilities. In particular, a user may issue a search query that comprises a web page identifier, such as a URL, for a particular web page, and the search engine 202 returns search results including one or more related search queries associated with the web page. The related search queries may be presented to the user via the user device 206 in hyperlink form, allowing user interaction with the related search queries. As such, a user may select a related search query, causing the search engine 202 to perform a search using the selected related search query and provide web page results to the user device 206.

Figure 3:
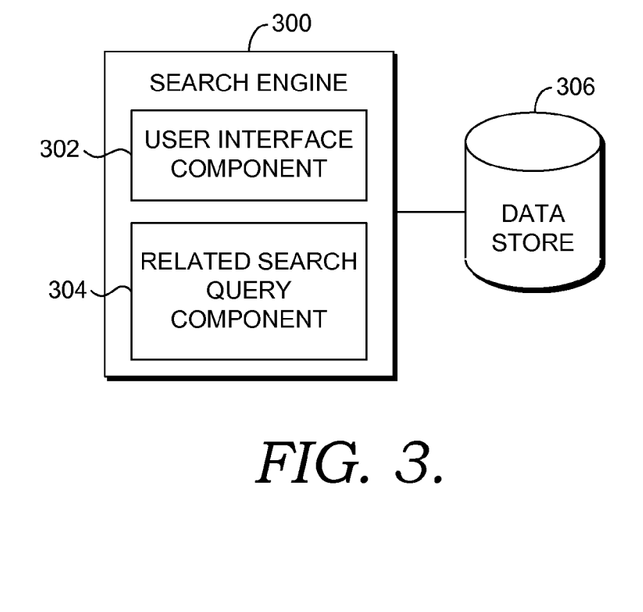
FIG. 3 is a block diagram of an exemplary search engine in accordance with an embodiment of the present invention.

Referring now to FIG. 3, an exemplary search engine 300 in accordance with an embodiment of the present invention will be described in further detail. Among other components not shown, the search engine 300 may include a user interface component 302, a related search query component 304, and a data store 306. Each component may comprise a program, routine, application, or other machine-executable code capable of performing the actions discussed herein. One skilled in the art will recognize that the components shown in FIG. 3 are provided for illustrative purposes only and other arrangements may be provided in accordance with various embodiments of the present invention.

Generally, the search engine 300 may receive search queries comprising web page identifiers from user devices, such as the user device 206 of FIG. 2, via the user interface component 302. The user interface component 302 may communicate to receive the web page identifiers from user devices and pass the web page identifiers to the related search query component 304 for determining related search queries for web pages associated with the web page identifiers. The user interface component 302 may also communicate to receive search results including related search queries from the related search query component 304 and return the search results to the user devices.

The related search query component 304 is configured to determine related search queries for web pages corresponding with web page identifiers provided to the search engine 300 by users. The related search query component 304 may collect information for a target web page, for example, by crawling the target web page or referring to an index or cache, such as within the data store 306, storing information regarding the target web page. As will be described in further detail below, using information associated with the target web page, the related search query component 304 may determine related search queries in a variety of different manners within the scope of the present invention. By way of example only and not limitation, related search queries may be determined by extracting keywords from the content of the target web page and determining related search queries based on the extracted keywords. In other embodiments, historical search information such as that found in query logs, for instance, may be used to determine related search queries for the target web page. In further embodiments, after determining related search queries for the target web page, the search engine 300 may index or cache related search query information in the data store 306. Accordingly, when subsequent inversion searches are requested from users for that particular web page, the related search queries may be determined by referring to stored information in the date store 306 mapping, for instance, a web page identifier for the target web page to related search queries. Any and all such variations are contemplated to be within the scope of embodiments of the present invention.

Figure 4:
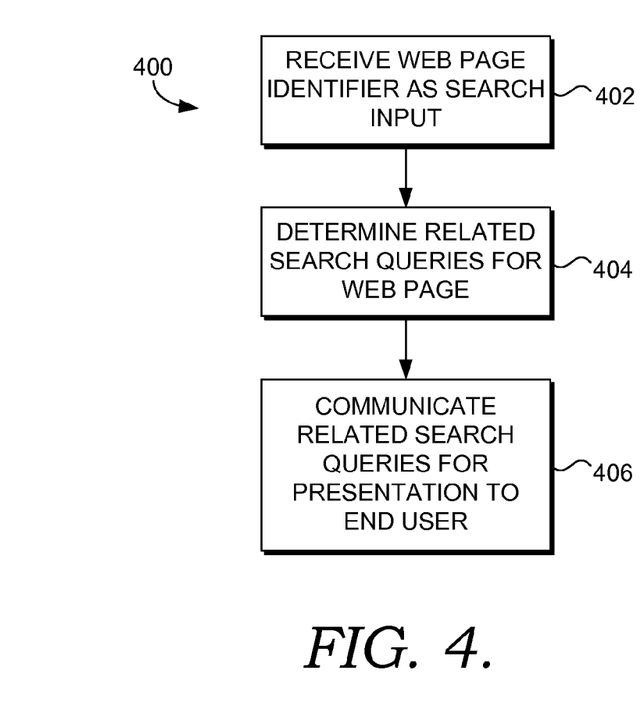
FIG. 4 is a flow diagram showing an exemplary method for determining related search queries for a web page in accordance with an embodiment of the present invention.

Turning now to FIG. 4, a flow diagram is provided showing an exemplary overall method 400 for performing an inversion search in accordance with an embodiment of the present inventions. Initially, as shown at block 402, a web page identifier, such as a URL, is received at a search engine. As one skilled in the art will recognize, the web page identifier may be received at the search engine in a number of different ways. By way of example only and not limitation, a user may employ a web browser to navigate to a search engine web page and enter the web page identifier in an input box on the web page. Additionally, a user may enter the web page identifier in an input box provided by a search engine toolbar located, for instance, within a web browser, the desktop of the user's computing device, or other location. One skilled in the art will recognize that a variety of other approaches may also be employed to allow an end user to provide a web page identifier as search input to a search engine.

After receiving the web page identifier, the search engine determines related search queries for the web page associated with the identifier, as shown at block 404. As indicated previously, related search queries for a web page may be determined in a variety of different manners within the scope of the present invention. By way of example only and not limitation, related search queries may be determined by extracting keywords from the content of the web page and determining related search queries based on the extracted keywords. In other embodiments, historical search information such as that found in query logs, for instance, may be used to determine related search queries for the web page. In further embodiments, related search queries may be determined by referring to an index mapping web page identifiers to related search queries. Any and all such variations are contemplated to be within the scope of embodiments of the present invention.

As shown at block 406, at least a portion of the related search queries are communicated for presentation to the end user. Although not required, a search results user interface (similar to those provided by search engines in the basic form of searching) is typically provided that lists the related search queries for the web page as search results. The related search queries may be ordered in the list based on rankings determined for the related search queries. The rankings may be based, for example, on the relevance of the related search queries to the web page and the popularity of the related search queries (e.g., based on historical search information). In some embodiments, only the highest-ranking related search queries may be communicated for presentation to the user, while in other embodiments all related search queries determined for a web page may be provided.

Each related search result included in the list may comprise a hyperlink allowing for the user selection of a related search query. Accordingly, when a user selects a related search query, a search is performed using the selected related search query and search results are provided. The search results for the selected related search query may be presented, for instance, in the original search results user interface with the related search queries (e.g., adjacent the selected related search query) or may be presented via a separate search results user interface.

In various embodiments of the invention, other search related information and types of search results may be provided in conjunction with the related search queries. For instance, related people, related places, related web pages, or other content related to the searched web page may be provided. In some embodiments, a search may be performed using one or more of the related search queries, and search results may be provided in conjunction with the related search queries. For example, the top five search results may be provided for the top five related search queries. Any and all such variations are contemplated to be within the scope of embodiments of the present invention.

Figure 5:
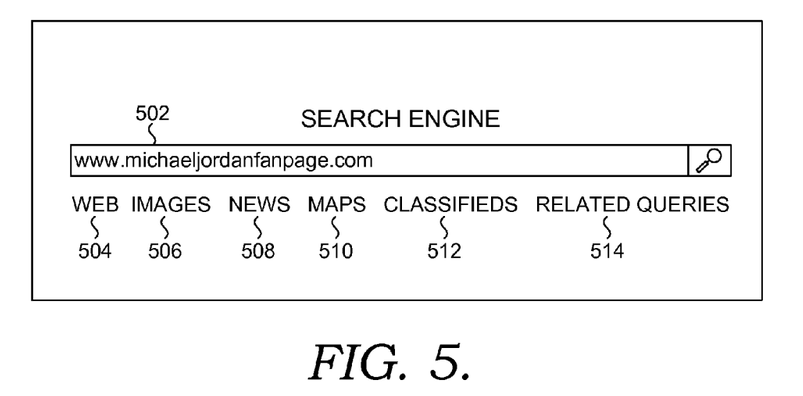
FIG. 5 is an illustrative screen display showing a search input box for a search engine in accordance with an embodiment of the present invention.

By way of illustration, FIG. 5 illustrates a search input box 502 that may be provided, for instance, via a search engine web page. The search input box 502 allows a user to enter an input for search purposes. As known in the art and shown in FIG. 5, a search engine may provide a variety of searching capabilities, including a broad web search and a variety of vertical searches. Accordingly, a number of search selections 504-514 are provided in conjunction with the search input box 502. The search selections 504-514 include a broad web search 504, a number of search verticals (i.e., an images vertical search 506, a news vertical search 508, a maps vertical search 510, and a classifieds vertical search 512), and a related queries search 514. By inputting a search query in the search input box 502 and selecting one of the search selections 504-514, a user may cause the search engine to perform the selected type of search using the inputted search query.

In the illustrated example, the user has entered the URL "www.michaeljordanfanclub.com" in the search input box 502. After entering the URL, the user may select the related queries search 514 to cause the search engine to perform an inversion search and provide related search queries for the web page associated with the entered URL. Alternatively, other approaches may be employed for indicating to the search engine that the user wishes to perform an inversion search. For instance, the user may enter "Related:" followed by the URL in the search input box 502 to indicate to the search engine that the user wishes to perform an inversion search. In some embodiments, instead of requiring the user to explicitly indicate that an inversion search is intended, the search engine may infer that the user wishes to perform an inversion search, for instance, based simply on the entry of a URL in the search input box 502.

Figure 6:
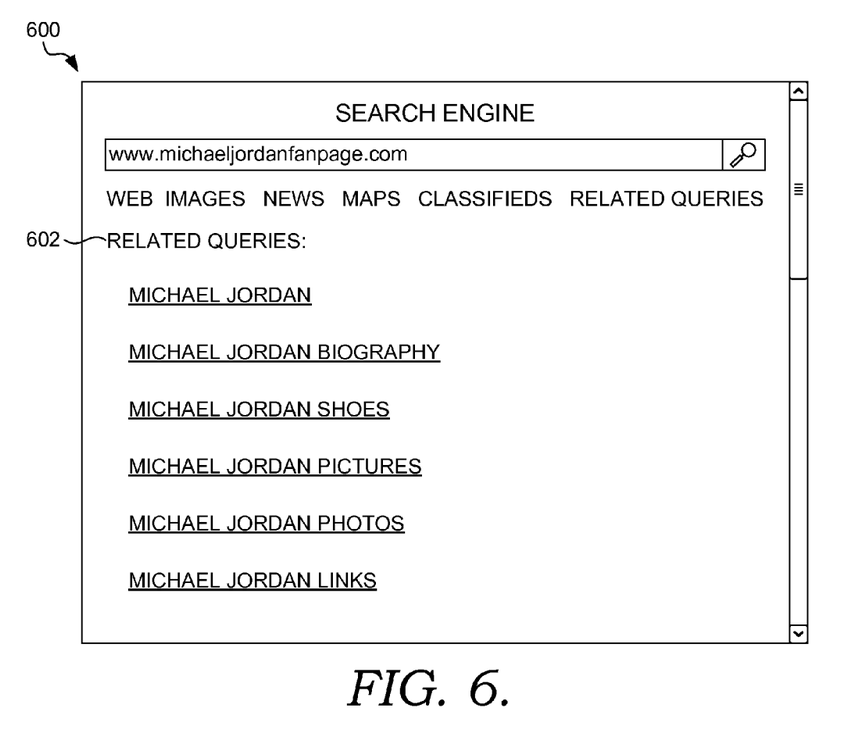
FIG. 6 is an illustrative screen display showing a search results user interface including related search queries for a web page in accordance with an embodiment of the present invention.

Using the URL entered in the search input box 502, the search engine performs an inversion search and provides a search results user interface 600 shown in FIG. 6. The search results user interface 600 includes a list of related search queries 602 for the web page associated with "www.michaeljordanfanpage.com." As indicated hereinabove, the related search queries may be presented in hyperlink form allowing the user to interact with the search results, for instance, by selecting a related search query and causing a web search to be performed for the selected related search query.

Figure 7:
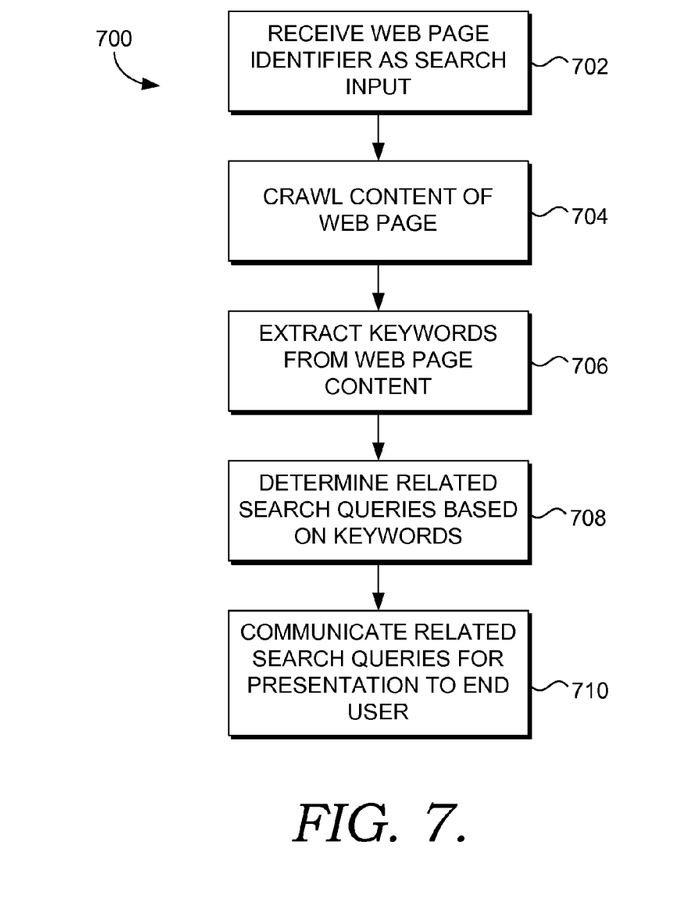
FIG. 7 is a flow diagram showing an exemplary method for determining related search queries based on extracted keywords for a web page in accordance with an embodiment of the present invention.
Figure 8:
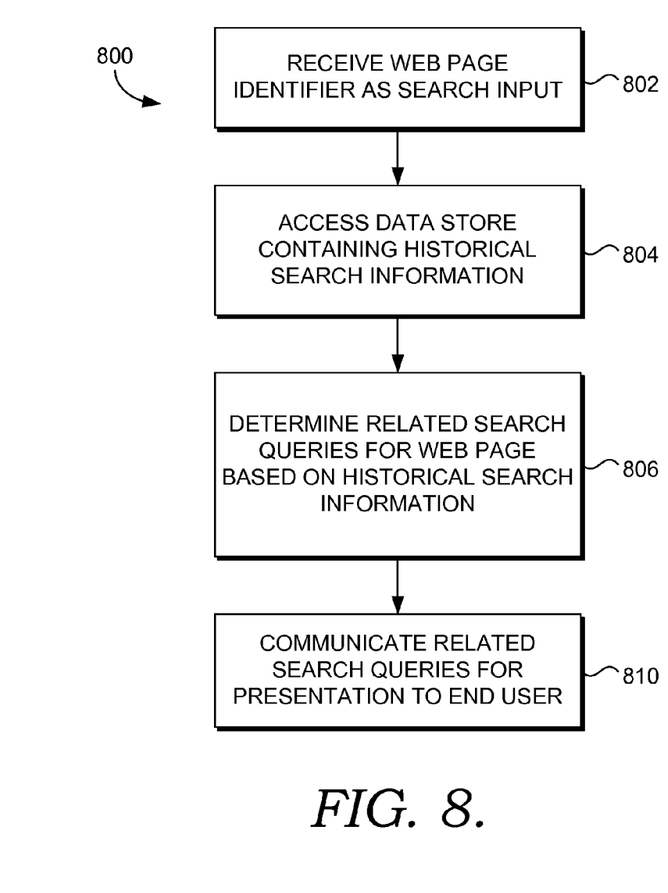
FIG. 8 is a flow diagram showing an exemplary method for determining related search queries for a web page using historical search information in accordance with an embodiment of the present invention.
Figure 9:
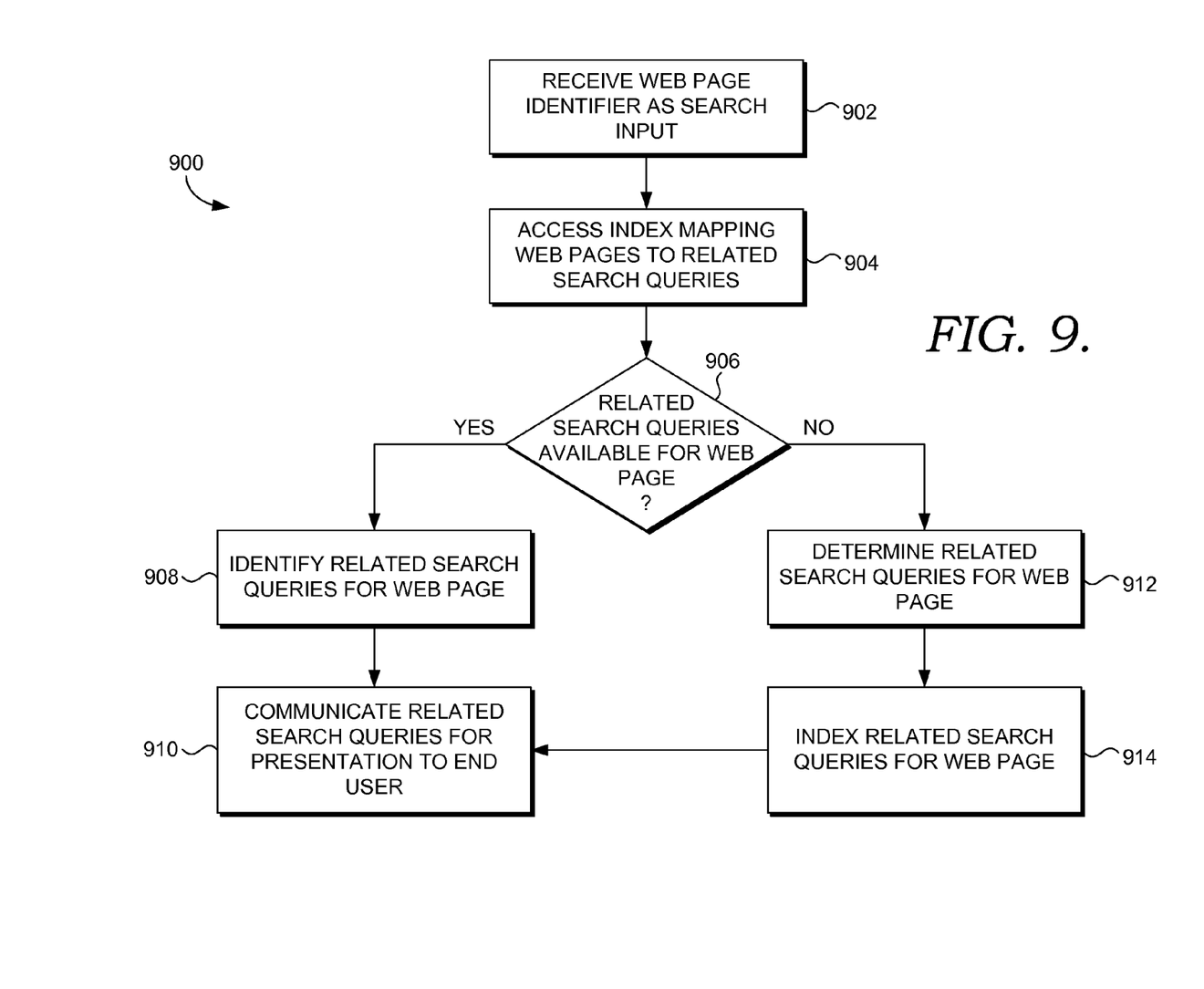
FIG. 9 is a flow diagram showing an exemplary method for determining related search queries for a web page using indexed data in accordance with an embodiment of the present invention.

FIGS. 7-9 provide a number of approaches for determining related search queries for a web page in accordance with various embodiments of the invention. It should be understood that the approaches discussed with reference to FIGS. 7-9 are provided for illustrative purposes only and should not be viewed as limiting. Accordingly, one skilled in the art will recognize that the described methods may be combined and other methods for determining related search queries for web pages may be employed within the scope of the present invention.

Referring initially to FIG. 7, a flow diagram is provided showing an exemplary method 700 for determining related search queries for a web page by extracting keywords from the content of the web page in accordance with an embodiment of the present invention. Initially, as shown at block 702, a web page identifier corresponding with a webpage is received as search input. Based on the web page identifier, the content of the web page is crawled, as shown at block 704.

As shown at block 706, keywords are extracted from the content of the web page. One skilled in the art will recognize that a wide variety of keyword extraction methods may be employed within the scope of the present invention. Information extraction is a popular topic in information retrieval research. For instance, in the context of web search, keywords may be extracted from various pieces of information for a web page including: anchor text of web pages that point to the present web page; the title of the web page; and the body of the web page (including outgoing anchor text, highlighted words, etc.). Using these various pieces of information, machine learning models can be built to predict which words of web pages are keywords. By way of example only and not limitation, a simple keyword extraction method may include, stemming functionality for standardizing words in the content of the web page to their respective root words. Additionally, stop-word filtering may be provided to identify and filter out stop words (i.e., words that are unimportant to the content of the web page). Further, low-usage word removal may be provided for removing words that appear less frequently than a certain pre-defined threshold. Still further, term frequency and inverse document frequency (TF/IDF) techniques may be used to calculate TF/IDF values of words and/or phrases included in the content of the web page. This value may subsequently be used to score the words/phrases relative to one another such that those with the highest scores may be identified as keywords and/or given greater weight in selecting related search queries for keywords.

As shown at block 708, related search queries are determined based on the extracted keywords. Determining related search queries based on extracted keywords may be performed in a variety of different manners within the scope of the present invention. By way of example only and not limitation, related search queries may be determined by comparing the extracted keywords against historical search information (e.g., information available in query logs). For instance, historical search information may include information regarding past searches performed by the search engine (i.e., using the basic form of searching), including search queries submitted by users. By analyzing such information, patterns of word sequences may be identified. Accordingly, given keywords extracted from the web page content, a number of patterns may be identified that match extracted keywords with high precision. These patterns may be provided as related search queries.

After determining related search queries for the web page, at least a portion of the related search queries are communicated for presentation to the end user, as shown at block 710.

Turning next to FIG. 8, a flow diagram is provided illustrating an exemplary method 800 for using historical search information to determine related search queries for a web page in accordance with an embodiment of the present invention. Initially, as shown at block 802, a web page identifier corresponding with a web page is received from an end user, for instance, via a search input box.

At block 804, a data store including historical search information is accessed. The data store may be, for example, a query log or search engine cache stored by a server (e.g., a search engine server), or web browser cache stored on a end user's computing device. The historical search information may include information regarding past searches performed by a search engine (i.e., the basic form of searching) including, for instance, past search queries received by a search engine, search results for the search queries, and user interactions (e.g., click-throughs or other selections choices) with the search results.

As shown at block 806, related search queries for the web page are determined using the historical search information. In some embodiments, related search queries for the web page may be determined from the historical query information by identifying past search queries whose search results included the web page. In further embodiments, related search queries for the web page may be determined by identifying past search queries that not only included the web page as a search result but also for which the web page was selected by users from the search results. Because the results which users most frequently choose to access may be empirically presumed to be the results which they as consumers of the information judged to be most relevant to their query, the latter approach may provide better related search queries for the web page.

After determining the related search queries for the web page, at least a portion of the related search queries are communicated for presentation to the end user as shown at block 810.

In some embodiments, related search queries may be indexed or cached for various web pages. For instance, to facilitate the basic form of searching (i.e., providing web page search results for search queries), a search engine will crawl web pages and index information about the web pages. Similarly, a search engine could crawl web pages and/or analyze historical search information to identify related search queries for web pages and index the information to facilitate inversion searching. Additionally or alternatively, in some embodiments, a search engine could be configured to cache related search queries for a web page after performing a inversion search for an end user. In either case, an index mapping web pages to related search queries may be available to facilitate inversion searching. For instance, referring to FIG. 9, a flow diagram is provided showing an exemplary method 900 for providing related search queries for a web page by employing an index in accordance with an embodiment of the present invention. As shown at block 902, a web page identifier for a web page is received. At block 904, an index mapping web pages to related search queries is accessed. After accessing the index, it is determined whether related search queries have been indexed for the web page, as shown at block 906. If related search queries have been indexed from the web page, the related search queries are identified from the index at block 908. Additionally, the related search queries are communicated for presentation to the end user, as shown at block 910.

If at block 906, it is determined that related search queries have not been indexed for the web page, related search queries are determined for the web page at block 912. The related search queries may be determined, for instance, by employing one of the methods described hereinabove. The related search queries are then indexed for the web page, as shown at block 914. Accordingly, the related search queries are readily available in the index for subsequent searches. The related search queries are also communicated for presentation to the end user at block 910.

In further embodiments of the present invention, related search queries and extracted keywords may be used to improve the basic form of search for a search engine. In particular, related search queries and extracted keywords may be used to improve the selection process of determining which web pages to index and may be used to improve the ranking of web pages for searches.

With respect to web page selection for indexing, the key goal of selection is to determine which web pages to index and which web pages to avoid. Since practical considerations dictate that search engines may be limited by the maximum size of their indices and it is impractical to crawl every web page produced on the web, search engines typically must be smart in choosing which web pages to index. Currently, a number of features are used when determining whether to index a web page, such as, for instance, the in-links of the web page, clicks that the web page receives, and the quality of anchor text. Embodiments of the present invention provide an additional measure for determining whether to index a web page. In particular, whether a web page should be indexed by a search engine may also be determined at least in part on related search queries for the web page.

Figure 10:
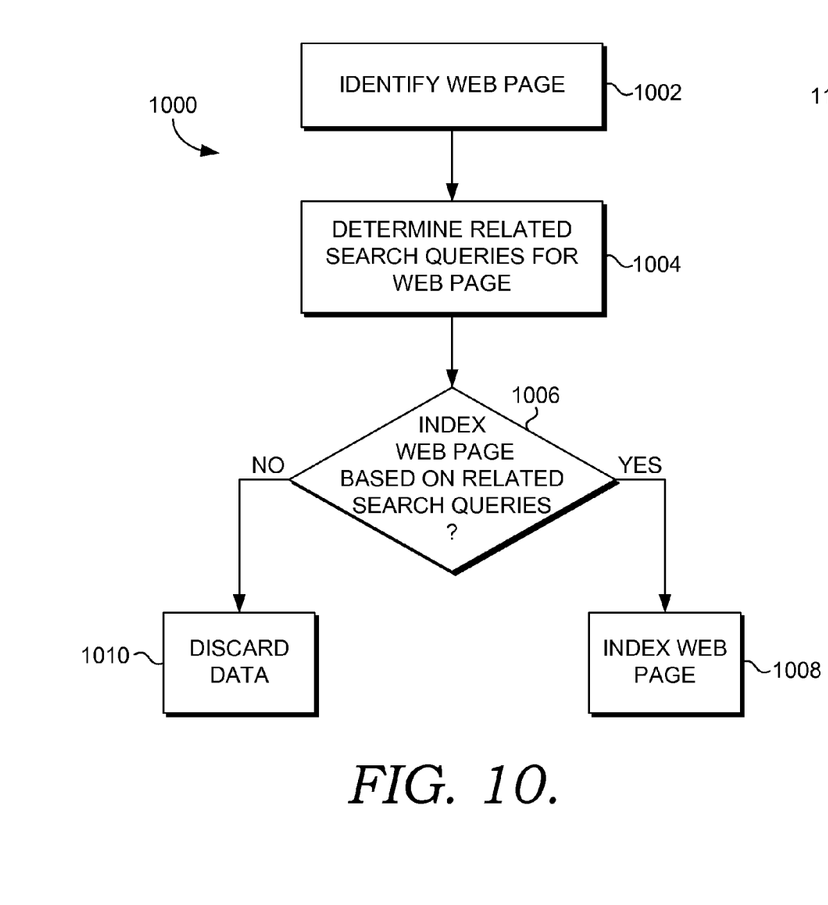
FIG. 10 is a flow diagram showing an exemplary method for determining whether to index a web page using related search queries in accordance with an embodiment of the present invention.

Referring to FIG. 10, a flow diagram is provided illustrating an exemplary method 1000 for determining whether to index a web page in accordance with an embodiment of the present invention. Initially, as shown at block 1002, a web page is identified, for instance, when a search engine spider application crawls the web. Related search queries for the identified web page are determined at block 1004, for instance, using one of the above-described methods for determining related search queries for web pages.

As shown at block 1006, a determination is made regarding whether to index the web page based at least in part on the related search queries for the web page. In some embodiments, the index determination may be based on the total volume of related search queries for a web page. For instance, because a web page answers a large number of search queries may indicate that the web page is one that many users would want to see. In other embodiments, the index determination may be based on the popularity of related search queries. The popularity of a search query may be determined, for instance, by referring to historical query information and determining the frequency of use of the search query against other search queries. Search queries having a higher frequency of use could be viewed as being more popular, such that web pages answering these popular queries should be indexed. It should be understood that other qualities of related search queries and keywords may also be considered in the index selection process. For instance, the extent to which related search queries and keywords are monetizable or "spammy" (e.g., the extent to which related search queries and keywords would result in higher-paying contextual advertisements) may be considered.

If it is determined that the web page should be indexed based on related search queries for the web page at block 1006, the web page is indexed, as shown at block 1008. Alternatively, if it is determined that the web page should not be indexed at block 1006, data associated with the web page may be discarded by the search engine, as shown at block 1008.

When building their indices, some search engines split their indices into what may be referred to as "small" and "big" indices. The small index is loaded completely into memory, whereas the big index is kept on a hard disk. This approach is often taken for search engines because while memory is quicker, it is also more expensive when compared to a hard disk. Accordingly, more popular web pages are typically included in the small index in memory to allow quicker search results. However, because memory is expensive, it typically isn't feasible to include all indexed information in memory.

One issue faced by search engines employing big and small indices is determining which web pages to index in the small index and which web pages to index in the big index. Some embodiments of the present invention may facilitate this determination. In particular, the same considerations applied in determining whether to index a web page using related search queries and extracted keywords may be applied in determining whether to index a web page in the small index or the big index.

Another issue faced by search engines that employ small and big indices is the problem of deciding which index to look up for a given query as looking up the big index for every search query is undesirable given that a hard disk is much slower than memory. Some embodiments of the present invention may assist this determination. In particular, a keyword/related search queries table may be created mapping keywords and related search queries to web pages and identifying whether the web pages are located in the small or big index. When a search engine receives search queries, the query may be looked up in the table to determine whether a sufficient number of results are located in the small index or if the search engine needs to return results from the big index.

Related search queries and extracted keywords may also be used to refine search engines by improving the relevance of search results for user search queries. While ranking web pages for a user search query, search engines traditionally try to match the query terms with the words that occur in several parts of web pages, such as the anchor text, title, body, and URL string. The different weights for matching different parts is tuned manually or using machine learning techniques. In embodiments of the present invention, these techniques may be improved by allowing a search engine to assign a higher weight to matches between terms from user search queries and extracted keywords and related search queries than with other words. For instance, feedback loops and other mechanisms may be applied using related search queries and extracted keywords to cause self-learning networks to adjust their weightings and other processing to generate more accurate and better quality search results for end users.

In some embodiments, historical inversion search information may also be used to improve web page ranking. When a search engine performs inversion searches for users, the search engine may track information regarding user interactions (e.g., click-throughs) with related search queries that are provided as search results for a web page. A high frequency of users selecting a particular related search query for a web page may be viewed as empirical evidence that the web page should be considered highly relevant for the selected related search query. Accordingly, web pages may be given higher weighting for search queries matching related search queries having a high frequency of user selection as evidenced by historical inversion search information.

Figure 11:
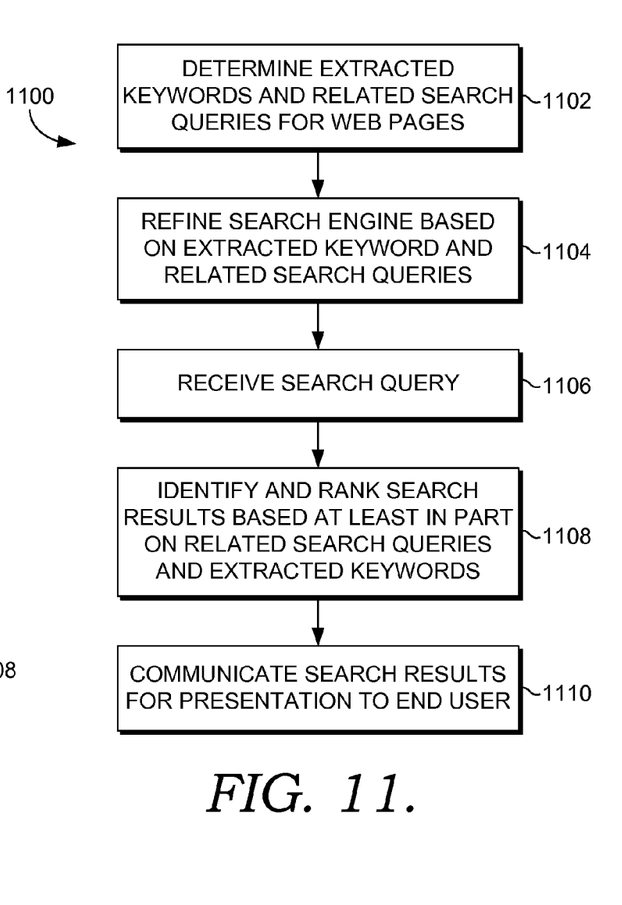
FIG. 11 is a flow diagram showing an exemplary method for refining a search engine and providing relevant search results by employing extracted keywords and related search queries in accordance with an embodiment of the present invention.

Accordingly, as shown in the exemplary method 1100 of FIG. 11, when a web search is performed for a user search query, related search queries and extracted keywords for web pages may be used in the ranking process to provide more relevant search results to end users. As shown at block 1102 of FIG. 11, keywords are extracted from web pages and related search queries are determined for web pages as described hereinabove. A search engine is refined using the extracted keywords and related search queries, as shown at block 1104. For instance, extracted keywords, related search queries, and historical inversion search information may be indexed by the search engine and/or used to adjust weightings and other processes or algorithms. As shown at block 1106, the search engine receives a search query from an end user. As such, when search results are identified and ranked for the search query at block 1108, the identification and ranking is based at least in part on the extracted keyword and related search query information. The ranked search results are then communicated for presentation to an end user, as shown at block 1110.

Still further embodiments of the present invention are directed to extending related search queries for web pages to particular business applications. Currently, a variety of contextual advertising programs are available that allow web page owners to place contextual advertisements on their web pages. However, users often view these contextual advertisements as distracting. In accordance with embodiments of the present invention, instead of (or in addition to) presenting contextual advertisements on a web page, related search queries for that web page are presented on the web page. When a user visiting the web page selects a related search query, the user is provided a search results user interface including search results for the selected related search query and contextual advertisements associated with the search results. In some embodiments, revenue generated from such contextual advertisements may be shared with the web page owner. This approach not only increases the search engine's traffic but also helps the web page owner provide a rich experience to visitors and generates revenue for both the search engine and the web page owner.

Figure 12:
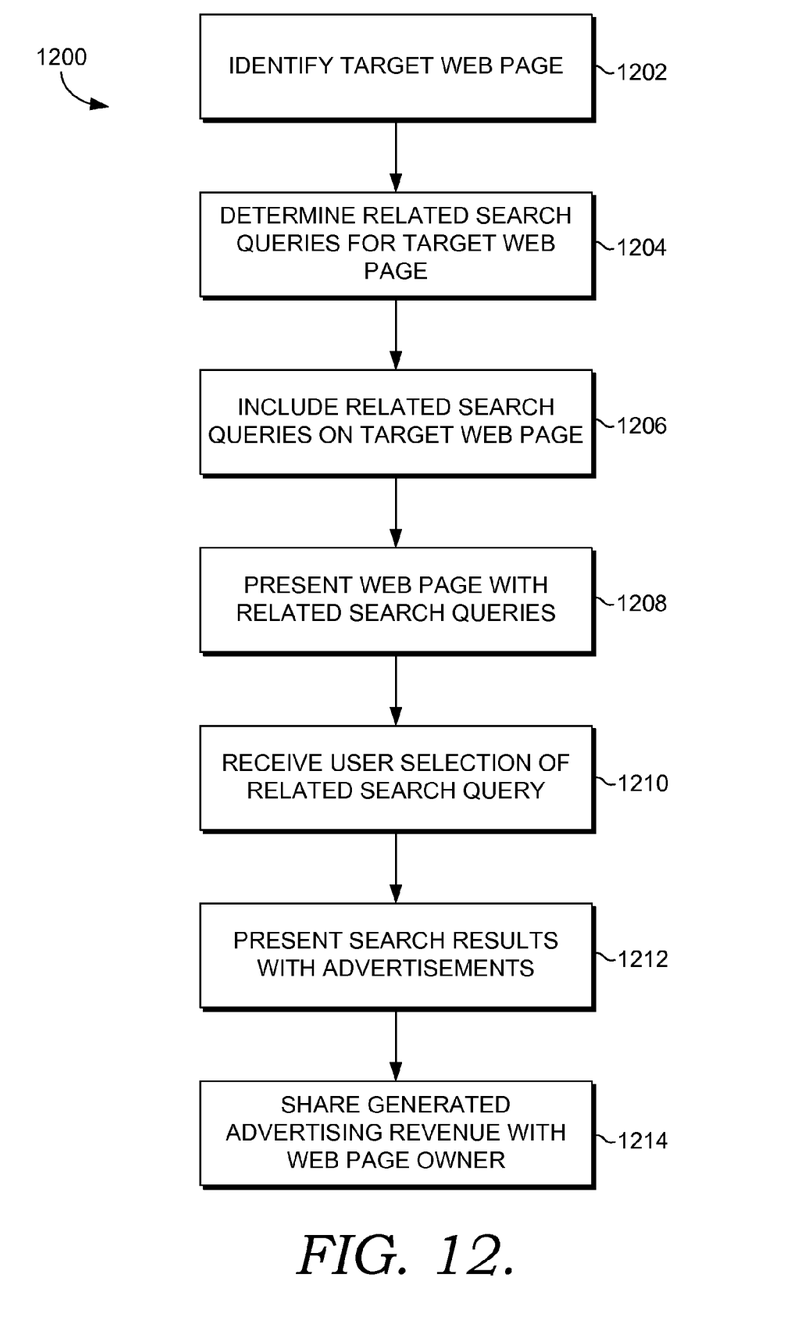
FIG. 12 is a flow diagram showing an exemplary method for providing related search queries on a web page and generating advertising revenue using the related search queries in accordance with an embodiment of the present invention.

Turning to FIG. 12, a flow diagram is provided illustrating an exemplary method 1200 for providing related search queries on a web page and generating advertising revenue using related search queries in accordance with an embodiment of the present invention. Initially, as shown at block 1202, a target web page is identified. Related search queries for the target web page are determined at block 1204 (e.g., using the methods for determining related search queries described hereinabove). The related search queries are included on the target web page, as shown at block 1206. When a user visits the target web page, the related search queries are presented in conjunction with the content of the web page, as shown at block 1208. The related search queries are presented in hyperlink form allowing user selection of the related search queries. The user may recognize the related search queries and wish to select one of the related search queries to find related web pages. Accordingly, as shown at block 1210, a user selection of a related search query is received. Based on the user selection, search results associated with the selected related search query are presented, as shown at block 1212. Typically, the search results are provided in a search results user interface. A number of contextual advertisements based on the search results are presented in conjunction with the search results.

When advertising revenue is generated via an advertisement presented with the search results, a portion of the advertising revenue may be shared with the web page owner, as shown at block 1214. As known in the art, advertising revenue may be generated based on various compensation models that may be employed by the search engine and/or advertisers. For instance, advertisers may provide compensation on a pay-per-impression, pay-per-click, pay-per-action, pay-per-purchase, or other compensation model. To facilitate the search engine in tracking and attributing advertising revenue to the web page owner, the hyperlinks for related search queries included on the target web page may include an identifier associated with the web page owner. In some embodiments, advertising revenue may be attributed to the web page owner on a session-based manner. For instance, typically when a user selects a particular related search query from the target web page, a search results user interface is presented with the search results as well as an input box for receiving subsequent searches. As such, the user may issue new search queries and cause the generation of advertising revenue at subsequent search result pages. Accordingly, in some embodiments, a portion of all advertising revenue generated by the user during this session may be allocated to the web page owner.

Figure 13:
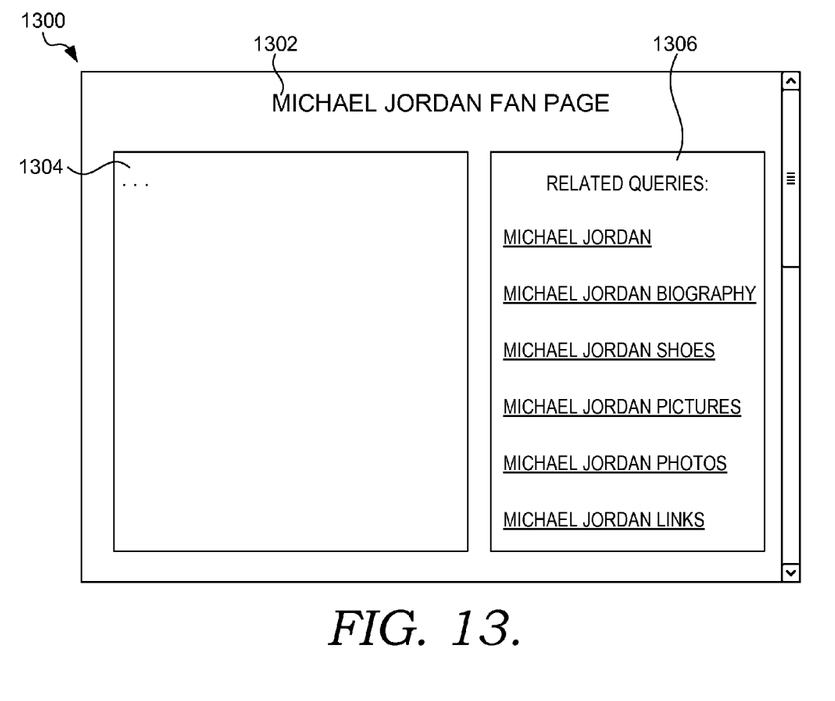
FIG. 13 is a an illustrative screen display showing a web page including related search queries for the web page in accordance with an embodiment of the present invention.
Figure 14:
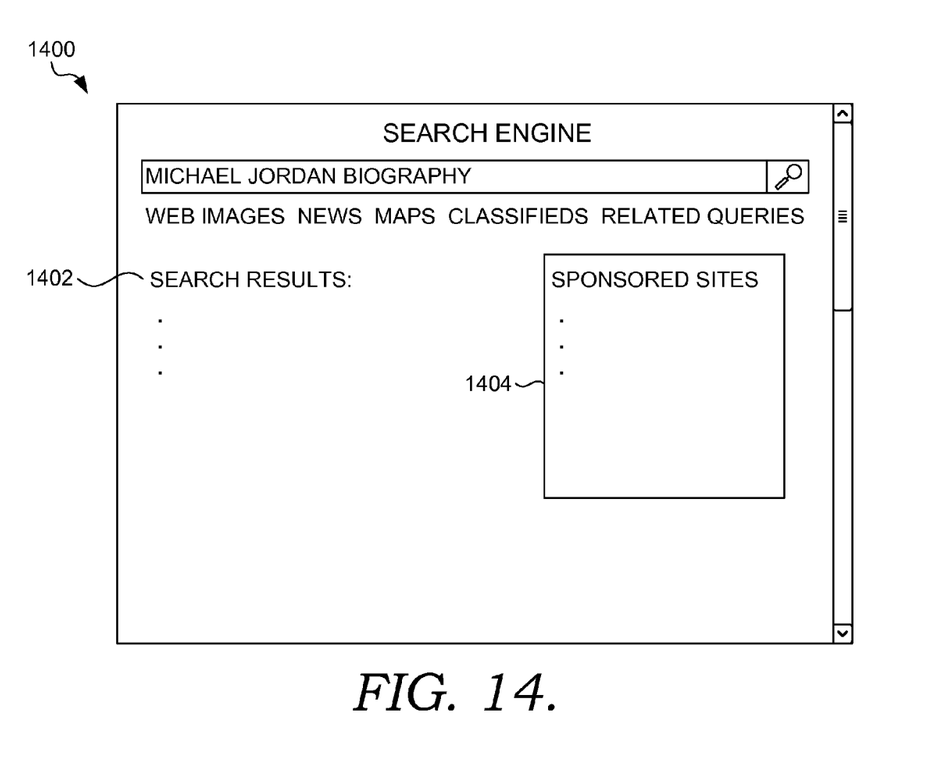
FIG. 14 is an illustrative screen display showing a search results user interface presented in response to a user selection of a related search query from a web page including contextual advertisements in accordance with an embodiment of the present invention.

By way of illustration of advertising sharing embodiments, FIG. 13 provides a screen display showing a portion of a hypothetical web page 1300 associated with the URL "www.michaeljordanfanpage.com" used in the example above described above with reference to FIGS. 5 and 6. As shown in FIG. 13, the web page 1300 includes a title 1302, content 1304, and a related queries area 1306. The related queries area 1306 provides a list of related search queries for the web page 1300. When a user selects one of the related search queries in the related queries area 1306, search results for the selected related search query are retrieved and presented to the user. In some embodiments, the search results may be presented on the web page 1300, for instance, within the related queries area 1306. In other embodiments, a search results user interface, such as the search results user interface 1400 shown in FIG. 14, is presented to the user. As shown in FIG. 14, the user interface 1400 includes a search results area 1402 listing the search results (not shown) for the selected related search query. Additionally, the user interface 1400 includes an advertisement area 1404 that presents a variety of contextual advertisements (not shown) selected based on the selected related search query and/or search results. As indicated above, when advertising revenue is generated via the advertisements, a portion of the advertising revenue may be shared by the search engine with the web page owner.

As can be understood, embodiments of the present invention provide for inversion searching in which a search engine consumes a web page identifier and provides related search queries for the target web page. Further embodiments of the present invention provide for the refinement of search engines by using extracted keywords and related search queries to identify web pages to index and to facilitate ranking web pages for search queries. Still further embodiments are directed to generating and sharing advertising revenue by placing related search queries on web pages.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for providing search results, the method comprising:
   receiving search input from an end user via an input box configured to receive input for a search engine;
   determining if the search input comprises one or more search terms or a web page identifier;
   if the search input comprises one or more search terms, performing a traditional search to identify one or more web pages as search results;
   if the search input comprises a web page identifier, performing an inversion search to identify one or more related search queries as search results, wherein the one or more related search queries are for a web page corresponding with the web page identifier, wherein the one or more related search queries are identified for the web page by:
      crawling content of the web page,
      extracting one or more keywords from the content of the web page,
      identifying patterns of frequently occurring words used in past search queries that correspond with the one or more keywords, and
      determining the one or more related search queries for the web page based on the patterns of frequently occurring words used in past search queries identified as corresponding with the one or more keywords; and
   directly responsive to receiving the search input via the input box, communicating a search results page including at least a portion of the search results for presentation to the end user, wherein the search results page includes at least a portion of the one or more web pages if the search input comprises one or more search terms and the search results page includes at least a portion of the one or more related search queries if the search input comprises a web page identifier.

2. The computer-implemented method of claim 1, wherein the web page identifier comprises a uniform resource locator.

3. The computer-implemented method of claim 1, wherein the input box is presented on at least one of a search engine web page and a search engine toolbar.

4. The computer-implemented method of claim 1, wherein identifying the one or more related search queries for the web page comprises identifying at least one search query that has previously been used in a search and resulted in a user selecting a search result associated with the web page from a list of search results for the at least one search query.

5. The computer-implemented method of claim 1, wherein identifying the one or more related search queries for the web page comprises accessing an index mapping related search queries to web page identifiers and identifying, in the index, the one or more related search queries mapped to the web page identifier associated with the web page.

6. The computer-implemented method of claim 1, wherein the search input comprises a web page identifier and the search results comprise the one or more related search queries, and wherein the method further comprises receiving a user selection of a first related search query and communicating one or more web page results for the first related search query for presentation to the end user.

7. The computer-implemented method of claim 1, wherein the method further comprises ranking the one or more related search queries.

* * * * *